Dec. 18, 1951          K. RABE          2,579,090
SYNCHRONIZING MECHANISM
Filed May 1, 1948          2 SHEETS—SHEET 1
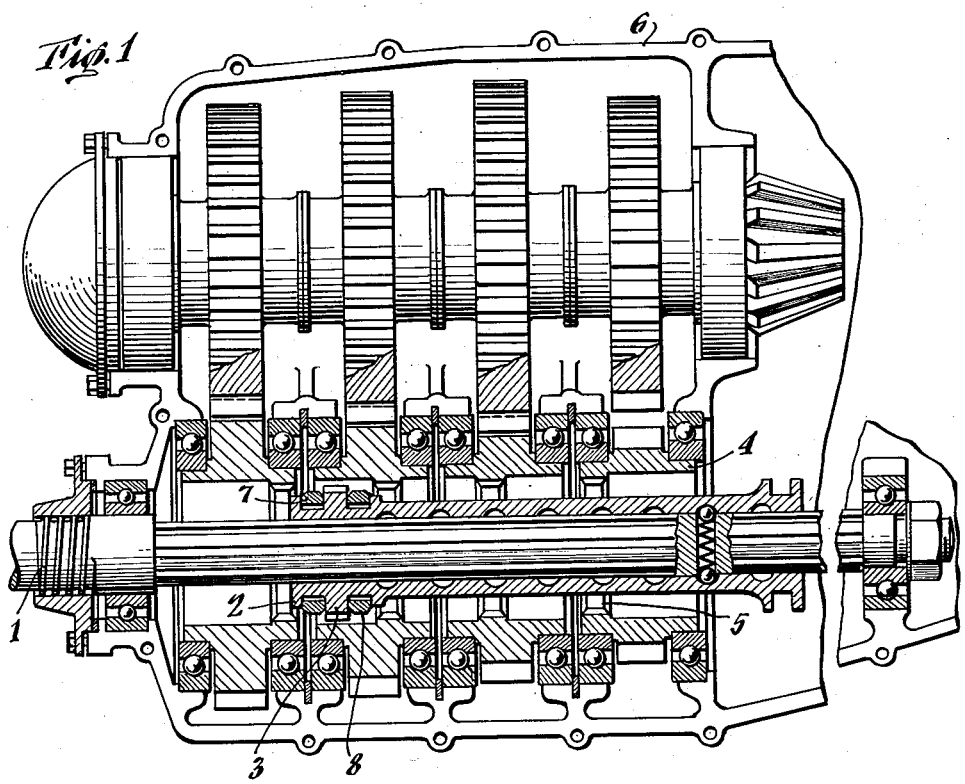
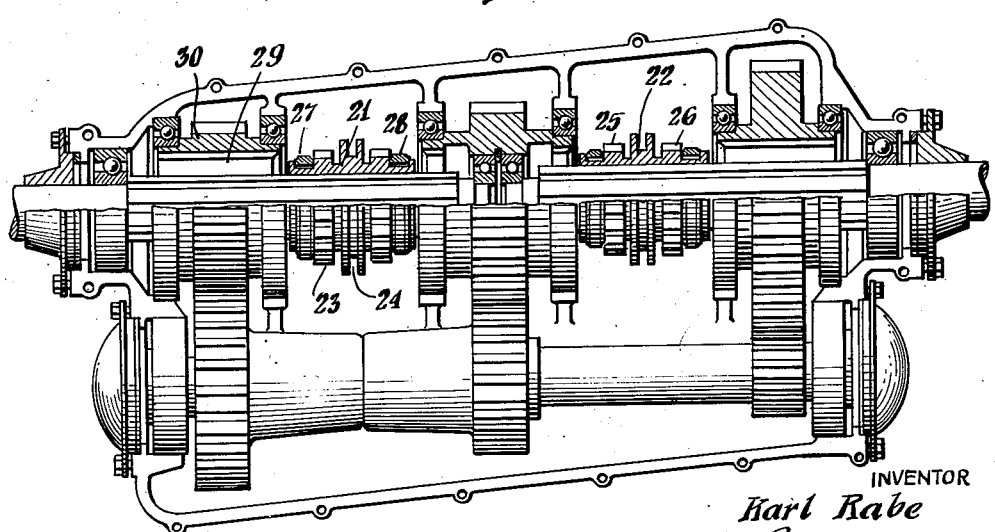
INVENTOR
Karl Rabe
BY
ATTORNEYS Dec. 18, 1951  K. RABE  2,579,090
SYNCHRONIZING MECHANISM
Filed May 1, 1948  2 SHEETS—SHEET 2
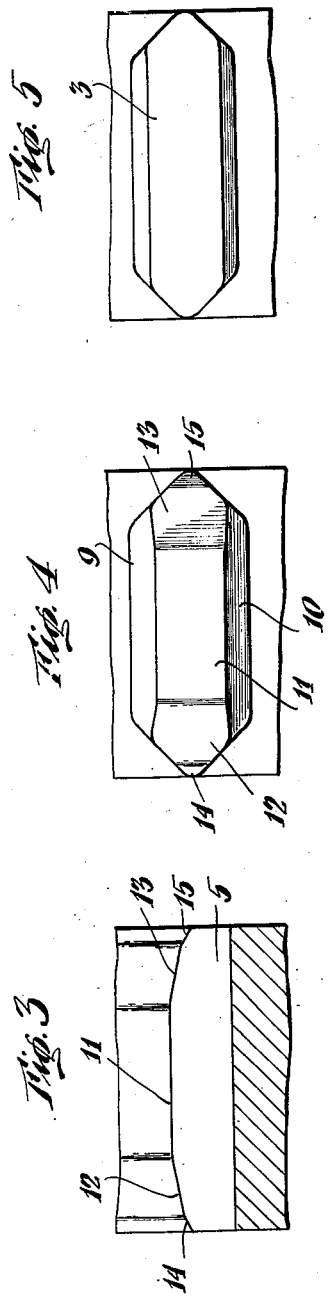
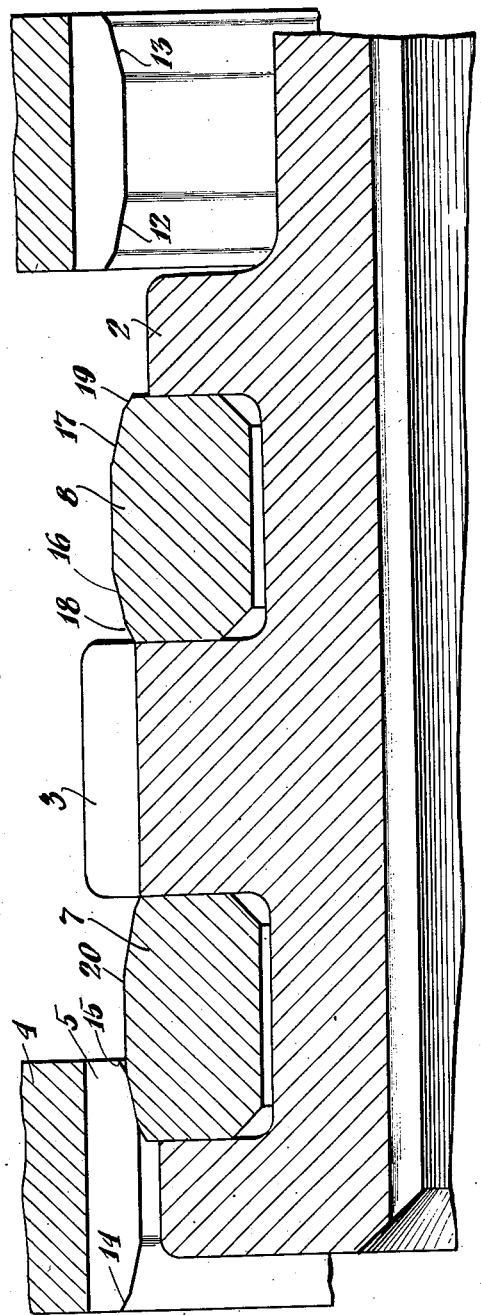
INVENTOR
Karl Rabe
BY
ATTORNEYS Patented Dec. 18, 1951

2,579,090

UNITED STATES PATENT OFFICE 2,579,090

SYNCHRONIZING MECHANISM

Karl Rabe, Gmund Karnten, Austria, assignor to Porsche Konstruktionen G. m. b. H., Gmund Karnten, Austria, a company of Austria Application May 1, 1948, Serial No. 24,564
In Austria May 2, 1947

6 Claims. (Cl. 192—53)

This invention relates to synchronizing mechanism, and particularly to such mechanisms of the synchronized mesh type in which the synchronized surfaces are engaged only during the gear shifting operation and are disengaged upon completion of the shifting operation.

Heretofore, transmissions of this type have embodied synchronizing mechanism which required a separate synchronizing device associated with each speed gear, resulting in such a relatively complicated construction that all of the speed gears were seldom provided therewith, the device usually being applied to one or two gears only.

An object of this invention is to provide an improved synchronizing mechanism for transmissions of the above type constructed and arranged to radically reduce both the total cost and the number of parts heretofore usually employed in such devices, and of such relatively simple form that all gears of a transmission can be readily synchronized.

A further object is to provide an improved synchronizing clutch element for mechanisms of the above type.

Other objects will become apparent from the following description of the invention taken together with the attached drawings wherein:

Fig. 1 shows a partial vertical central longitudinal section through a three-speed transmission with a reverse gear;

Fig. 2 is a partial vertical central longitudinal section through a four-speed transmission of another constructional form;

Fig. 3 is a side view of a clutch tooth according to the invention, on a larger scale;

Fig. 4 is a top plan view of the internal tooth shown in Fig. 3;

Fig. 5 is a top plan view of a modified clutch tooth of the sleeve member to the same scale as Fig. 3; and Fig. 6 is a partial longitudinal section through the actuating sleeve and the gears in engagement with it of the construction according to Fig. 1 to a larger scale.

According to the invention a portion of the lands or top faces of the clutch teeth of the speed gears is formed as a friction clutch surface. Each tooth face is provided with an inclined surface toward each end of the tooth to form friction surfaces adapted to coact with corresponding friction surfaces on synchronizing bodies formed on an intermediate or clutch member, in effecting operative engagement to obtain synchronization. By using the clutch teeth of the gears themselves to form synchronizing friction clutch surfaces, the synchronizing mechanism is reduced to a relatively few parts only. The cooperating friction surfaces are provided by synchronizing members formed by spring rings which have inclined surfaces towards their side surfaces at the same inclination as the clutch teeth of the gears cooperating with the rings. In order to obtain a shock-free engagement, the inclined friction surfaces of the gear teeth and of the synchronizing rings terminate in more steeply inclined centering surfaces.

When the gears to be actuated are provided with the inclined friction surfaces and coact with synchronizing rings on the actuating sleeve, the entire synchronizing arrangement then consists only of two rings disposed on the intermediate sleeve or clutch member together with the friction surfaces on the gears. Each gear can be operated with this simple synchronizing arrangement.

In Fig. 1 is shown as an example of the invention a change-speed transmission in which is mounted on the driving shaft 1 an intermediate clutch member in the form of a sliding sleeve 2, splined to the shaft for longitudinal movement and rotatable with the shaft. The sliding sleeve is provided with clutch teeth 3. Each gear 4 has a central bore with internal clutch teeth 5 and is rotatably mounted in the casing 6. On both sides of the clutch teeth 3 there are mounted on the sliding sleeve synchronizing bodies in the form of slotted yieldable synchronizing rings 7 and 8, as shown in detailed outline in Fig. 6.

In order to obtain synchronization during a gear shift, according to the invention the synchronizing rings and the clutch teeth 5 coacting with them are provided with special synchronizing surfaces. The clutch teeth 5 (Fig. 3 and 4) have the usual flanks 9 and 10 for transmitting the torque and head or top faces 11. The top faces are formed to provide friction clutch surfaces and are inclined on both sides of the faces at the same angle to form frictional inclined synchronizing surfaces 12 and 13. The inclined synchronizing surfaces terminate in more steeply inclined centering surfaces 14 and 15, in order to insure proper engagement. In addition, each of the clutch teeth 5 is tapered or chamfered to a point at both sides as shown in Fig. 4. The synchronizing rings 7 and 8 are alike and are also provided with friction surfaces having the same inclination as the clutch teeth 5. They form inclined frictional synchronizing surfaces 16 and 17 and more steeply inclined centering surfaces 18 and 19 which also have the same inclination as the corresponding centering surfaces of the clutch teeth 5.

When shifting gears by sliding the intermediate member or clutch sleeve 2, for instance, from right to left in Fig. 6, the centering surfaces 15 of the clutch teeth 5 will first of all engage the centering surfaces 18 of the synchronizing ring 7. On the clutch sleeve continuing its motion, the ring 7 will be slightly compressed. Synchronization will be established during the sliding over one another of the frictional surfaces 13 of the clutch teeth and the friction surfaces 16 of the synchronizing ring. While further compressing the synchronizing ring, the top faces 11 of the clutch teeth will then slide over the central surface 20 of the synchronizing ring and finally the clutch teeth 5 will mesh with the teeth 3, thus completing the operation.

The teeth 3 (Fig. 5) of the sliding sleeve are of ordinary known form. For facilitating the gear shifting operation the teeth preferably taper to a point in a similar manner as the clutch teeth 5.

Should the synchronizing rings be arranged, in a construction differing from that of Fig. 1, next to the clutch teeth 5 of the gears 4 and should the sliding sleeve 2 have only the clutch teeth 3 without synchronizing rings, then, in order to obtain synchronization, the clutch teeth 3 would be provided with inclined friction and centering surfaces, while the internal teeth 5 could be made in the known manner.

The invention is applicable to various kinds of transmissions. Thus, for instance, there is shown in Fig. 2 a double actuating sleeve transmission, in which by sliding the two sleeves 21 and 22 four speeds can be operated. Each of the sliding sleeves consists of a middle part 23 with a groove 24 for engagement with the slide bars. On both sides of the groove, clutch teeth 25 and 26 of the usual kind are provided. In order to obtain synchronization in a simple manner according to the invention, there are provided next to the teeth in grooves in the sleeve, slotted spring synchronizing rings 27 and 28 which are provided in the same manner as the synchronizing rings shown in Fig. 6 with inclined friction surfaces and more steeply inclined centering surfaces. The internal teeth 29 of the gears, for instance of the gear 30, also have top faces which, however, only have inclined friction surfaces and more steeply inclined centering surfaces at that end facing the end of the sliding sleeve, as there will be no meshing of the clutch teeth from the other side. The inclinations of the friction surfaces of the synchronizing rings are again the same as the inclinations of the teeth, and the inclinations of the centering surfaces of the synchronizing rings are the same as the inclinations of the centering surfaces of the clutch teeth on the gears, so that engagement takes place in the same way as described in connection with Fig. 3. By omitting one or more of the synchronizing rings 27 it is possible to bring about synchronization for only some of the transmission gears.

The invention is not limited to the coacting friction surfaces of the clutch teeth and the synchronizing ring or rings being made flat. They may also be barrelled, that is may form arcs. Engagement will then take place along the arc of a circle perpendicular to the axis of rotation of the toothed gears and of the synchronizing rings, which favors wear.

Having described an illustrative embodiment of the invention, it is pointed out that various changes and modifications may be made therein without departing from the invention as set forth in the following claims.

What is claimed is:

1. The combination in a synchronizing mechanism for relatively longitudinally movable clutch members having teeth adapted to mesh in coupling engagement, of a yieldable synchronizing clutch surface on one member adapted to engage the clutch teeth on said other member in advance of said coupling operation, the clutch surface having a top face, a flank portion extending downwardly from said face, a frictional inclined synchronizing surface extending forwardly and rearwardly respectively of said top face, and a steeply inclined centering surface extending from each of said synchronizing surfaces for frictional precoupling engagement by said clutch surface.

2. The combination in a synchronizing mechanism for relatively movable clutch members having teeth adapted to mesh in coupling engagement, of a longitudinally movable yielding synchronizing clutch ring on one member adapted to frictionally engage the top faces of the clutch teeth on said other member in advance of said coupling operation, said teeth of the clutch members having a top face, a flank portion extending downwardly from said face, a frictional inclined synchronizing surface extending forwardly and rearwardly respectively of said top face and a steeply inclined centering surface extending from each of said synchronizing surfaces and the yielding clutch ring having an unbroken surface corresponding with the top face flank portion, inclined synchronizing surface and steeply inclined centering surface respectively of the clutch teeth to facilitate precoupling of the clutch members.

3. In a synchronizing mechanism for relatively movable clutch members having teeth to mesh in coupling engagement relatively of each other, the improvement comprising a gear having teeth forming a friction clutch surface, said teeth having a top face, a flank portion extending downwardly from each face, a frictional inclined synchronizing surface extending forwardly and rearwardly respectively of said top face, and a steeply inclined centering surface extending from each of said synchronizing surfaces, and a yieldable friction clutch member adjacent said gear having an external unbroken contacting surface and outline corresponding in shape with the gear teeth, said member being movable into and out of initial clutching engagement with said gear teeth.

4. In a synchronizing mechanism with relatively movable clutch members therein having teeth adapted to mesh in coupling engagement for changing speed transmissions, the improvement comprising a power shaft, actuating clutch means, a synchronizing resilient annular member on either side of said actuating means adapted to frictionally engage the selected clutch member, said resilient member being each provided with a top face, a frictional inclined synchronizing surface extending forwardly and rearwardly respectively of said top face, and a steeply inclined tapering terminal surface extending from the synchronizing surfaces, and a plurality of coaxial spaced gears having internal teeth thereon each mounted around the shaft and adapted for variable speed, said gears having teeth with surfaces corresponding with the surfaces of the resilient angular member to permit frictional contact with said member.

5. In a synchronizing mechanism for change speed transmissions, having an axially movable rotatable driving member, and a plurality of rotatable selectively driven members mounted coaxially with said driving member and being axially spaced relatively of each other, the improvement comprising driven members each having internal gear teeth, said teeth having a top face, a flank portion extending downwardly from each side of said face, a frictional inclined synchronizing surface extending forwardly and rearwardly respectively of said top face, and a steeply inclined centering surface extending from each of said synchronizing surfaces, and yieldable frictional resilient compressible clutch means adapted to be slid over the teeth of said driven members, said compressible clutch means being provided with a continuous surface corresponding with the teeth of the driven members to insure proper pre-engagement with the selected driven member before engagement with the rotatable driving member.

6. In a geared power transmission having a drive shaft and a plurality of transmission gears for imparting different speeds, the improvement comprising gears having internal gear teeth, said internal teeth having separate and distinct surfaces each consisting of a top face with relatively inclined sides forming a frictional inclined synchronizing surface extending forwardly and rearwardly respectively of said top face, and a steeply inclined centering surface extending from each of said synchronizing surfaces, said surfaces being connected by an intermediate flared portion, a cooperating clutch member mounted on the shaft and longitudinally movable thereon, said clutch member being adapted selectively to move telescopically into and out of mesh with said internal teeth on the transmission gears, and radially resilient annular synchronizing means mounted on either side of said clutch member, said synchronizing means having a top face with relatively inclined sides forming a frictional inclined synchronizing surface extending forwardly and rearwardly respectively of said top face and a steeply inclined centering surface extending from each of said synchronizing surfaces for yieldingly engaging the surfaces of said internal teeth of the selected transmission gear when moved longitudinally on said drive shaft, and means for actuating said clutch member to engage and disengage the selected transmission gear.

KARL RABE.

REFERENCES CITED

The following references are of record in the file of this patent:

UNITED STATES PATENTS

| Number | Name | Date |
|---|---|---|
| 1,511,232 | Murray | Oct. 14, 1924 |
| 1,853,988 | Murray | Apr. 12, 1932 |
| 1,927,641 | Griffith | Sept. 19, 1933 |
| 1,957,416 | Weydell | May 1, 1934 |
| 1,967,190 | Cousino | July 17, 1934 |
| 2,044,930 | Zubaty | June 23, 1936 |
| 2,416,154 | Chilton | Feb. 18, 1947 |